United States Patent
Pulford et al.

(10) Patent No.: US 11,090,984 B2
(45) Date of Patent: Aug. 17, 2021

(54) SENSOR SYSTEM FOR MONITORING TIRE WEAR

(71) Applicant: The Goodyear Tire & Rubber Company, Akron, OH (US)

(72) Inventors: Carl Trevor Ross Pulford, Akron, OH (US); Cheng-Hsiung Lin, Hudson, OH (US)

(73) Assignee: The Goodyear Tire & Rubber Company, Akron, OH (US)

(*) Notice: Subject to any disclaimer, the term of this patent is extended or adjusted under 35 U.S.C. 154(b) by 47 days.

(21) Appl. No.: 16/225,192

(22) Filed: Dec. 19, 2018

(65) Prior Publication Data
US 2019/0184763 A1 Jun. 20, 2019

Related U.S. Application Data

(60) Provisional application No. 62/608,155, filed on Dec. 20, 2017.

(51) Int. Cl.
*B60C 11/24* (2006.01)
*B60C 11/12* (2006.01)

(52) U.S. Cl.
CPC ........ *B60C 11/243* (2013.01); *B60C 11/1259* (2013.01); *B60C 11/246* (2013.01)

(58) Field of Classification Search
CPC .. G01M 17/02; G01M 17/021; G01M 17/022; G01M 17/027; G01M 17/025; G01M 17/024; G01M 17/10; G01M 7/08; G01M 17/0076; G01M 17/013; G01M 17/03; G01M 17/04; G01M 17/06; G01M 17/08; G01M 1/02; G01M 1/045; G01M 1/12; G01M 1/225; G01M 3/40; G01M 5/0091; G01M 7/02; G01M 99/00; G01M 99/002; B60C 23/0494; B60C 2019/004; B60C 23/0493; B60C 19/00; B60C 23/04; B60C 23/0498; B60C 23/064; B60C 23/0488; B60C 23/0496; B60C 23/0408; B60C 23/041; B60C 23/0411; B60C 23/20; B60C 23/0486; B60C 23/06; B60C 11/243; B60C 11/246; B60C 23/061; B60C 99/00; B60C 11/0083; B60C 13/003; B60C 2009/2038; B60C 23/00; B60C 23/003; B60C 23/004; B60C 23/02; B60C 23/0401; B60C 23/0406; B60C 23/0416;
(Continued)

(56) References Cited

U.S. PATENT DOCUMENTS

| | | | | |
|---|---|---|---|---|
| 2006/0090558 A1* | 5/2006 | Raskas | ..................... | B60C 11/24 73/146 |
| 2014/0360256 A1* | 12/2014 | Orlewski | .............. | B60C 11/243 73/146 |
| 2014/0365069 A1* | 12/2014 | Orlewski | .............. | G01M 17/02 701/32.7 |

FOREIGN PATENT DOCUMENTS

EP 3498499 A1 * 6/2019 ........... B60C 11/246

* cited by examiner

*Primary Examiner* — Andre J Allen
(74) *Attorney, Agent, or Firm* — June E. Rickey

(57) ABSTRACT

A tread wear indicator is affixed to a respective tire tread element. The indicator is constructed as a plurality of electroactive sensor elements operatively configured and located to sequentially sacrificially abrade and change in electrical signal responsive to a progressive tread wear of the respective tread element. The electroactive elements are connected by printed circuitry that communicates an electrical signal to a passive RFID sensor tag that can be powered and read by a RFID reader.

9 Claims, 7 Drawing Sheets

(58) Field of Classification Search
CPC ............ B60C 23/0433; B60C 23/0455; B60C 23/0459; B60C 23/0474; B60C 23/0489; B60C 23/0491; B60C 25/002; B60C 25/005; B60C 25/007; B60C 29/02; B60C 3/04; B60C 99/006; B60C 11/0332; B60C 11/24; B60C 13/001; B60C 13/02; B60C 15/0036; B60C 17/02; B60C 2009/0071; B60C 2009/2022; B60C 2200/02; B60C 2200/06; B60C 2200/065; B60C 23/001; B60C 23/007; B60C 23/008; B60C 23/0413; B60C 23/0427; B60C 23/0447; B60C 23/0454; B60C 23/0457; B60C 23/0462; B60C 23/0467; B60C 23/0471; B60C 23/0472; B60C 23/0476; B60C 23/0479; B60C 23/0484; B60C 23/065; B60C 23/066; B60C 23/10; B60C 25/0548; B60C 25/056; B60C 25/132; B60C 25/138; B60C 25/18; B60C 29/005; B60C 9/005; B60C 9/18; B60C 9/1807; B60C 9/20; B60C 9/28; G01L 17/00; G01L 17/005; G01L 19/0645; G01L 19/147; G01L 1/16; G01L 1/18; G01L 7/187; G01L 9/0052; G01L 9/008

See application file for complete search history.

SENSOR SYSTEM FOR MONITORING TIRE WEAR

FIELD OF THE INVENTION

The invention relates generally to a sensing system for real-time monitoring of tire wear over its life time and, more specifically, to a sensing system based on tire-embedded tread wear sensor implementation.

BACKGROUND OF THE INVENTION

The use of tread wear indicators is not new and the use of tread wear indicators is mandated by law in many countries. A variety of such indicators are known. Once such type employs colored indicia below the tread for a visual indicator of wear. Other types use tie-bar type elements in the tread grooves.

The practical problem with the colored indicators of the type mentioned is that, being visual, the vehicle operator has to manually inspect each tire on the vehicle while it is stationary in order to find the colored indicators on the tire circumference, which is slow and inconvenient it is also difficult to do in muddy, dirty or snowy conditions. Similar problems occur when the tire employs the tie-bar type wear indicator and it can be difficult to determine the extent of wear until the tire is completely worn. It is quicker and easier for the operator to use the visual Lincolns head penny coin method.

U.S. Pat. No. 6,523,586 discloses wear indicators for a tire tread wherein, in a series, or predetermined closely located grouping, of related marks, the marks disappear as the tire is worn. While this provides continuous information to the consumer, the complexity of forming the tire is increased due to the need to form multiple different marks that appear only after a defined amount of wear. While providing information about the extent of wear to the vehicle operator, this visual type of wear indicator suffers from the same practical operational problems mentioned above in [003]. Furthermore, the measurement is not numerical or digital so in order to derive full information from it, such as the rate of wear, the results must be transcribed into a computer or smart phone. This is slow and inconvenient for the operator.

A cheap and effective tread wear indicator which is readily integrated into a tire and which reliably measures tread wear in a manner easily monitored by a vehicle operator is, accordingly, desired and heretofore unattained.

SUMMARY OF THE INVENTION

According to a first aspect of the invention, a vehicle tire and tread wear sensor comprises a tire having a tread; a tread wear sensor mounted in the tread, said tread wear sensor comprising at least one electrical element, wherein the electrical element is mounted in the tread at a first tread depth, wherein the electrical element is made of an electroactive polymer for emitting a voltage in response to deformation of the tread.

DEFINITIONS

"Groove" means an elongated void area in a tread that may extend circumferentially or laterally about the tread in a straight curved, or zigzag manner. Circumferentially and laterally extending grooves sometimes have common portions and may be sub classified as "wide", "narrow", or "sipe". The slot typically is formed by steel blades inserted into a cast or machined mold or tread ring therefor. In the appended drawings, slots are illustrated by single lines because they are so narrow.

A "sipe" is a groove having a width in the range from about 0.2 percent to 0.8 percent of the compensated tread width, whereas a "narrow groove" has a width in the range from about 0.8 percent to 3 percent of the compensated tread width and a "wide groove" has a width greater than 3 percent thereof. The "groove width" is equal to tread surface area occupied by a groove or groove portion, the width of which is in question, divided by the length of such groove or groove portion; thus, the groove width is its average width over its length. Grooves, as well as other voids, reduce the stiffness of tread regions in which they are located. Sipes often are used for this purpose, as are laterally extending narrow or wide grooves. Grooves may be of varying depths in a tire. The depth of a groove may vary around the circumference of the tread, or the depth of one groove may be constant but vary from the depth of another groove in the tire. If such narrow or wide groove are of substantially reduced depth as compared to wide circumferential grooves which they interconnect, they are regarded as forming "tie bars" tending to maintain a rib-like character in the tread region involved.

"Inner" means toward the inside of the tire and "outer" means toward its exterior.

"Outer" means toward the tire's exterior.

"Radial" and "radially" are used to mean directions radially toward or away from the axis of rotation of the tire.

"Tread" means a molded rubber component which, when bonded to a tire casing, includes that portion of the tire that comes into contact with the road when the tire is normally inflated and under normal load. The tread has a depth conventionally measured from the tread surface to the bottom of the deepest groove of the tire.

"Tread Element" is a protruding portion of a tread such as a lug or rib which constitutes the element that comes into contact with the road.

BRIEF DESCRIPTION OF THE DRAWINGS

The invention will be described by way of example and with reference to the accompanying drawings in which.

DETAILED DESCRIPTION OF THE INVENTION

Figure 1:
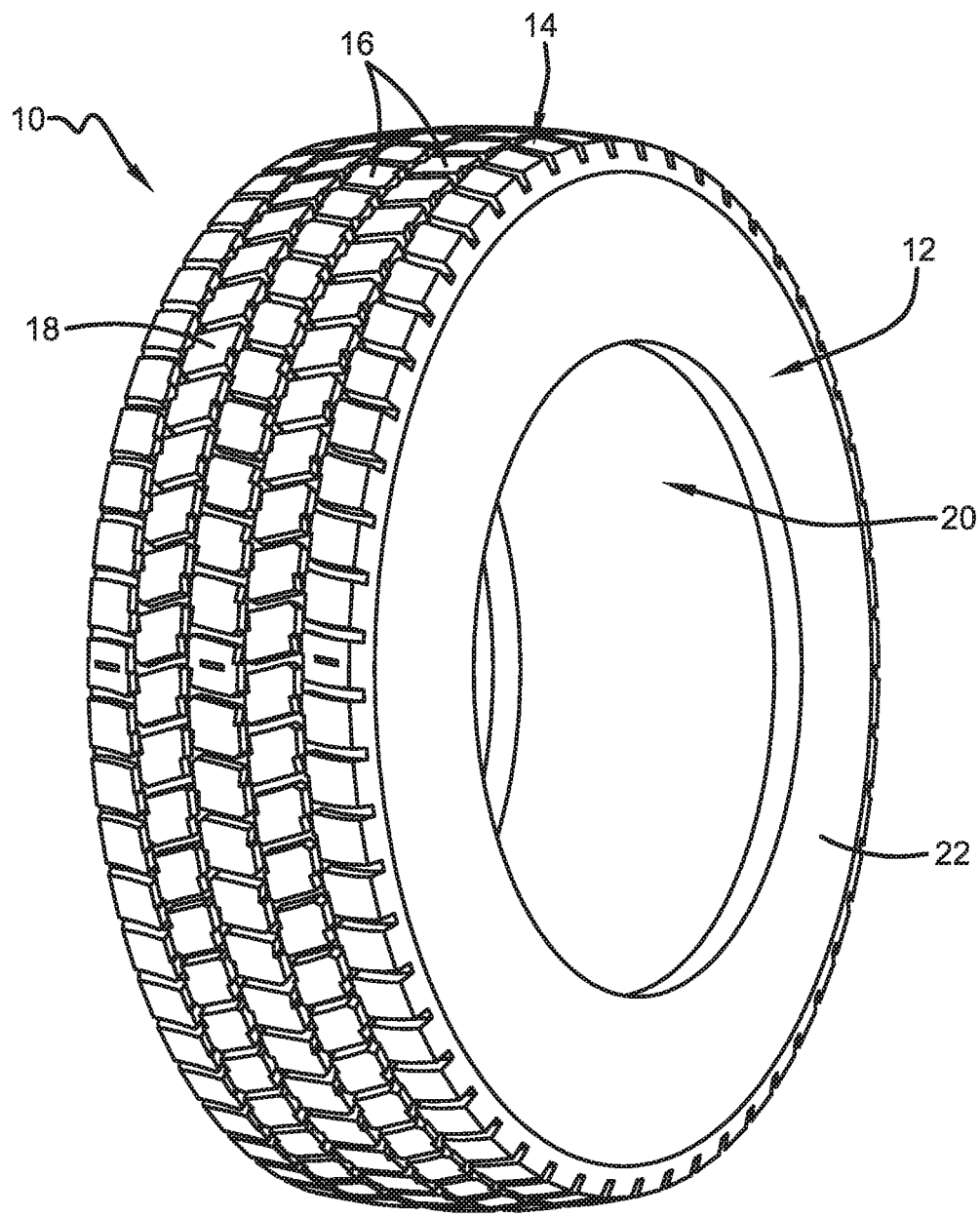
FIG. 1 is a perspective view of a tire and tread wear sensor assembly.

Referring to FIG. 1, an example tire 10 is shown having a sidewall 12 and a radially outward tread 14. The tread 14 as shown may further include one or more tread elements 18, such as for example, multiple rows of tread lugs 16. However, the tread elements 18 may also be tread blocks or tread ribs. However, the invention is not limited to a tread with tread elements 18, and may also be used on a smooth outer tread surface having no tread elements. The tire 10 further includes an inner liner or air impervious layer 20. Pursuant to conventional tire construction, the tire 10 is formed as a tire carcass 22 in a green tire build procedure and subsequently cured into the finished tire product.

Figure 2:
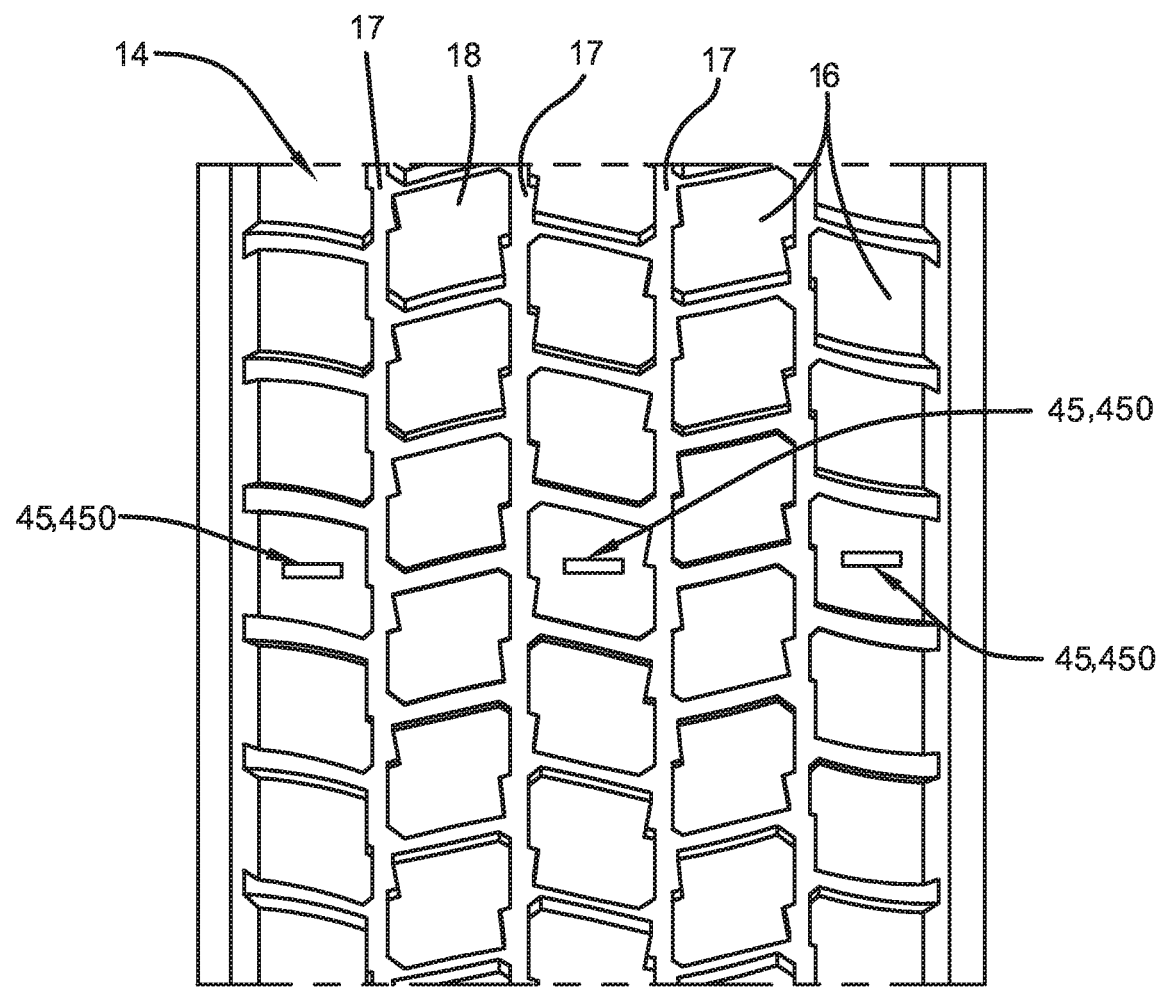
FIG. 2 is a close-up front view of a tire and tread wear sensor assembly.

FIG. 2 illustrates an enlarged view of the tread region, illustrating the tread rows 16 formed by the spaced apart tread elements 18 that are separated by circumferential grooves 17. At least one of the tread elements 18, and preferably multiple tread elements, are equipped with a sensor 45, also referred herein as a "wear sensor" or "treadwear indicator." The purpose of the sensor is to detect the progressive wearing of the tread elements 18 or the depth of a tire tread having no tread elements. One or more of the tread wear sensors 45 are mounted in the tread in order to monitor the general tread wear of the tire. By monitoring tread wear digitally by a wireless electrical reader, the wear status of the tire and rate of wear may be ascertained. From determining the wear status of the tire, a decision on whether and when to replace the worn tire may be made.

Figure 3:
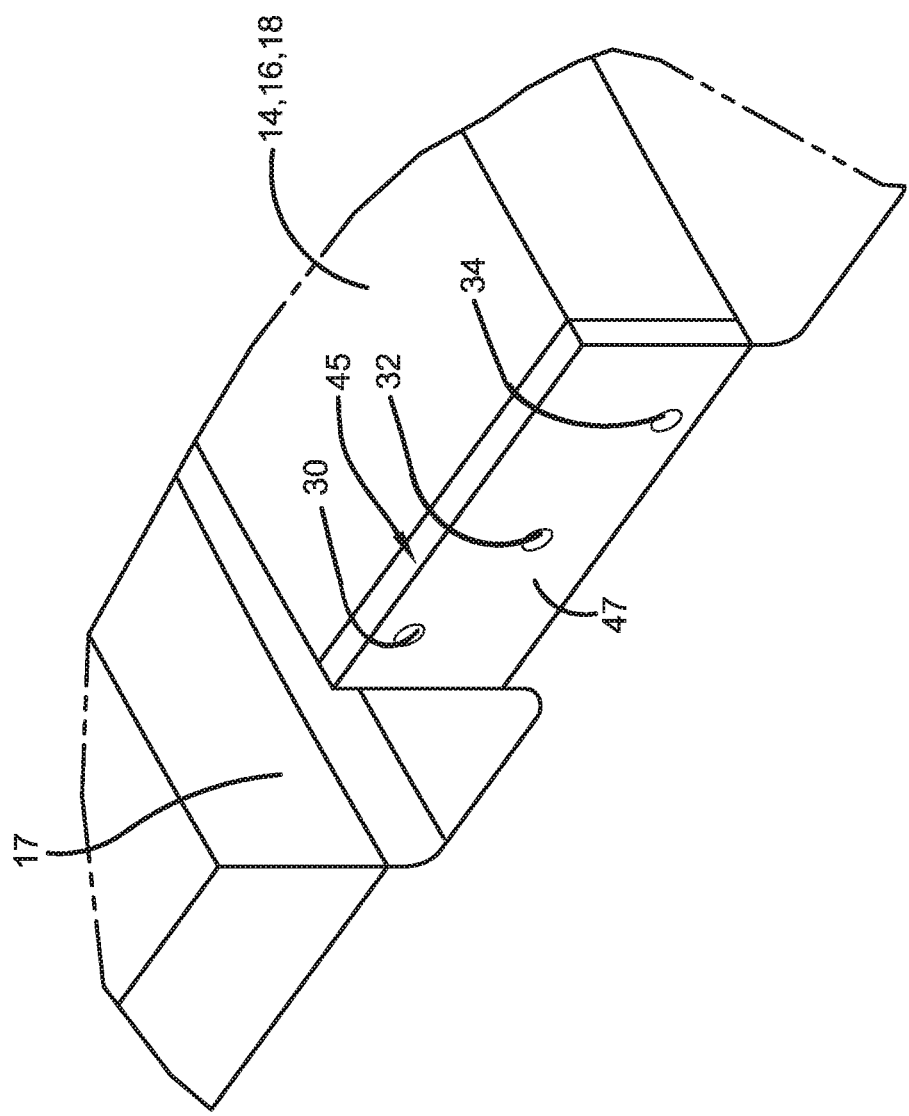
FIG. 3 is a perspective cross-sectional view of a tire tread showing a first embodiment of the sensor location, and the inner portion of the tire showing the reader.

With reference to FIG. 3, the principle by which the tread wear sensors 45 operate will be understood. Each tread wear sensor 45 is constructed having at least one electrical element 30, preferably an array 30,32,34 of electrical elements. Each electrical element 30,32,34 may be placed at a different radial height above the minimum legal non-skid depth of the tread, and at different locations such as the shoulder area, the middle portion of the tread and even on different locations on a tread element to detect heel toe wear. Preferably, the one or more electrical elements are formed of an electroactive polymer. An electroactive polymer is a type of polymer or layered composite of polymers that exhibits a change in size or shape when stimulated by an electrical field. Electroactive polymers also emit a voltage when deformed. The size of the electroactive polymer element is in the range of 0.1 to 25 mm, more preferably in the range of 1-3 mm. Electroactive polymers of this size can be cut from strips of soft electroactive polymers that are commercially available. A first example of an electroactive polymer suitable for use with the invention is An Electroactive Polymer Sensor Kit sold by Parker Hannifin Corp., Quick Couplings Division, 1320 Orleans Drive, Sunnyvale Calif. 94089. A second example of an electroactive polymer are copolymers of stearyl acrylate and long chain urethane diacrylate as described by Q. Pei of UCLA in Macromolecules 2016, 49, pg 134-140. Thus, by locating the electroactive polymer elements at different depths in a tread, the tread deformation causes the electroactive polymer elements to emit an electrical signal such as voltage. As the tire tread wears away, the electroactive elements will be sacrificed i.e. sequentially removed from the tire in order from the radially outermost position to the radially inward position. Therefore, by occasionally measuring the electrical signal emitted by each electroactive element, the rate of tire wear and remaining nonskid depth can be deduced from the sequential disappearance of the electrical signal of a given electroactive element.

Preferably, the array of electroactive elastomers are encased or mounted upon a cured swatch 47 of conventional tire tread compound. The swatch may also be a thin film or thin slice of rubber or elastomer. Preferably, the rubber swatch is made of tread compound. The cured swatch 47 may be glued to the sides of a tread block or inserted into a sipe or groove post cure of the tire.

Figure 4:
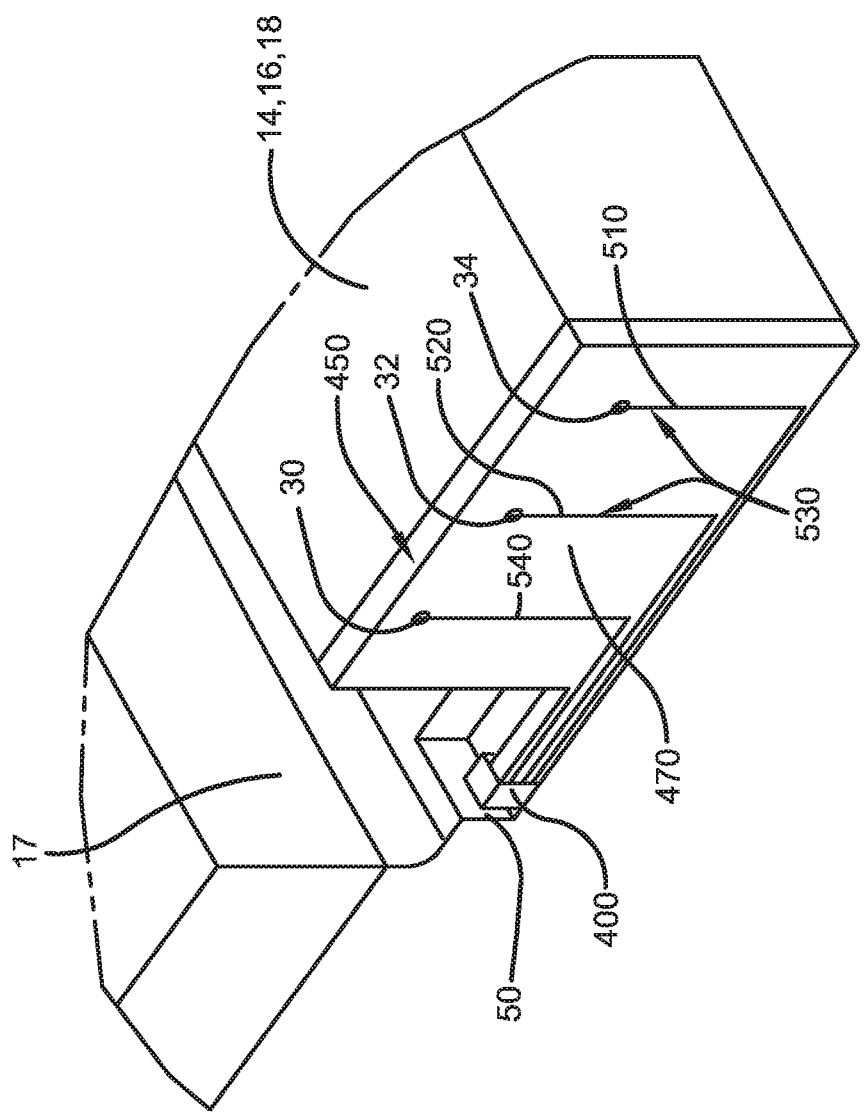
FIG. 4 is a perspective view of a second embodiment of a tire and tread wear sensor assembly.

A second embodiment of the tread wear sensor 450 is shown in FIG. 4. The electroactive elements 30,32,34 are mounted on an insert 470. The insert 470 is made out of a thin layer of rubber or elastomer or a thin layer of rubber applied to an optional thin metal blade. The thin layer of rubber has a printed circuit 530 on its outer surface, with a first printed conductive line 510 in electrical communication with an electroactive element 34, a second printed conductive line 520 in electrical communication with an electroactive element 32, and a third printed conductive line 540 in electrical communication with electroactive element 30. The printed circuit 530 is printed on rubber with stretchable ink. The printed circuit may be other configurations as desired. The printed circuit 530 may be a type of on/off circuit that has multiple layers that are positioned in a radial direction of a tread, so that as the tread wears, the layers are sacrificed, indicating the level of wear by determining the tread depth associated with the remaining circuits that are not shorted. The circuit may be printed directly onto a rubber swatch or insert by an ink jet printer or by screen printing. The ink must be stretchable and electrically conductive. One suitable ink for use in a tire is made by Engineering Materials Systems, Inc, Nagase Group, in Delaware, Ohio and is sold under the trade name CI-2061. In one example, the type of ink that would work is graphite ink.

The assembled tread wear sensor 450 is mounted post cure in a cured tire as described. A sipe 13 or narrow groove is either molded into the green tire or cut into the cured tire 12. The insert 470 is inserted into the sipe or groove and glued into place. A mini RFID tag 400 in chip form 400 is mounted to the insert 470 and is in electrical communication with the printed circuit 530. Alternatively, a pocket 15 may be formed in the bottom of a groove 17, under the Non-skid depth, and the RFID tag is mounted in the pocket as shown in FIG. 4. The RFID tag 400 is preferably a passive tag, and more preferably a UHF passive tag and includes functionality to sample and measure parameters such as voltage and further has the capability to wirelessly transmit data when interrogate by a UHF-RF reader.

Location of Readers

Figure 5:
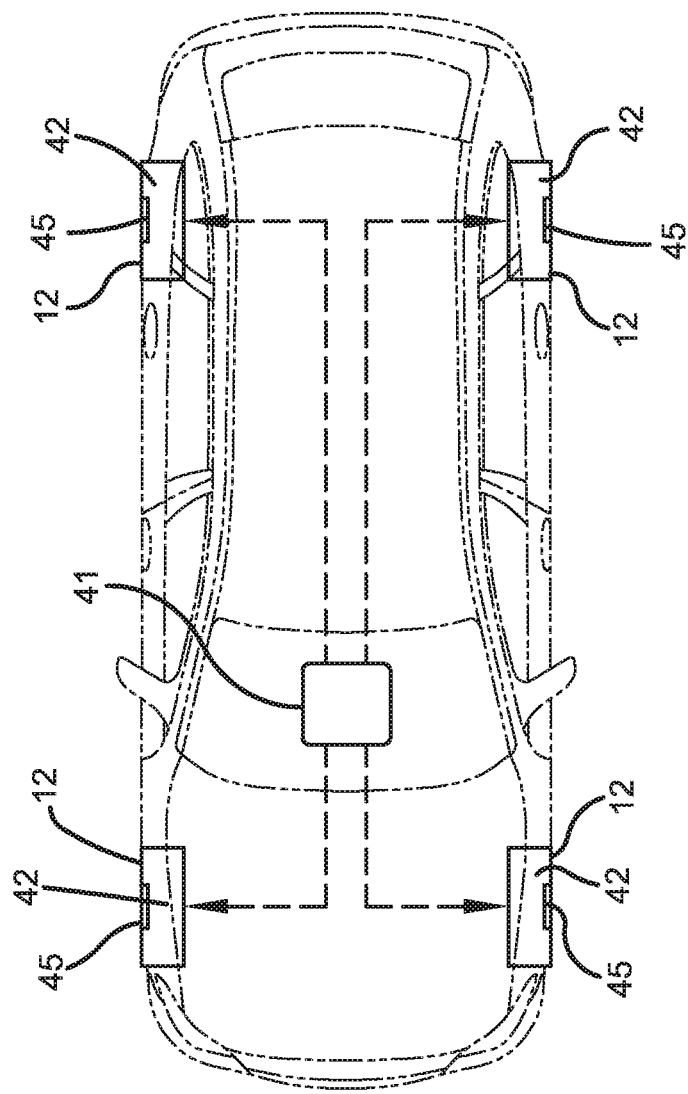
FIG. 5 is a schematic diagram of a vehicle having a tire and tread wear assembly mounted on each axle, and a hub mounted miniature RFID reader with a power receiver, and a central wireless charging transmitter mounted on the vehicle.

One or more readers 40 are utilized to read the electrical signal of the electroactive element or read the data from the RFID tag. In one embodiment, one or more readers 40 may be mounted on the inside of the tire, such as on the inner liner 50 or tire inner surface. Each reader 40 may be incorporated into a rubber patch that is glued post-cure to the innerliner or other tire component in close proximity to a corresponding electrical element 30,32,34, as is currently done in the aero-tire balance patches. In another embodiment as shown in FIG. 5, there are four miniature readers 40 located at each vehicle axle, wherein the readers 40 may be mounted on a tire component such as the innerliner or bead, or outside the tire such as on the wheel, or the vehicle axle. Each miniature reader 40 is preferably passive and in electrical communication with a power receiver 42 so that it would be powered wirelessly by electromagnetic waves from a central vehicle wireless charging transmitter 41. The wireless charging transmitter 41 is powered by the vehicle battery and wirelessly charges each miniature reader 40 via the power receiver 42.

Figure 6:
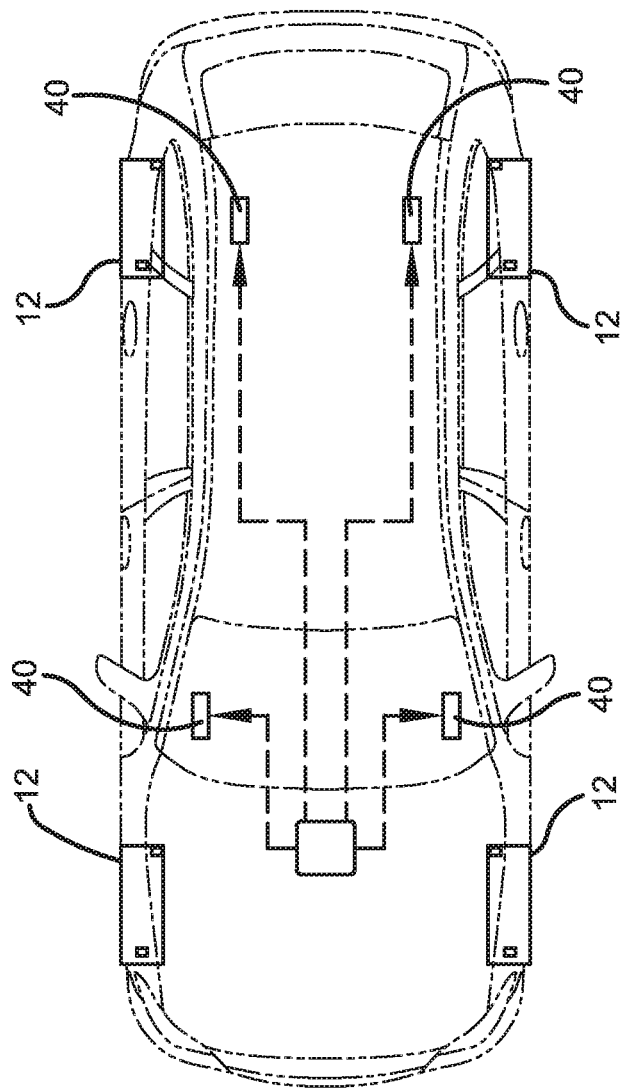
FIG. 6 is a schematic diagram of a vehicle having a tire and tread wear assembly mounted on each axle, and a vehicle mounted miniature RFID reader with power source from the vehicle.
Figure 7:
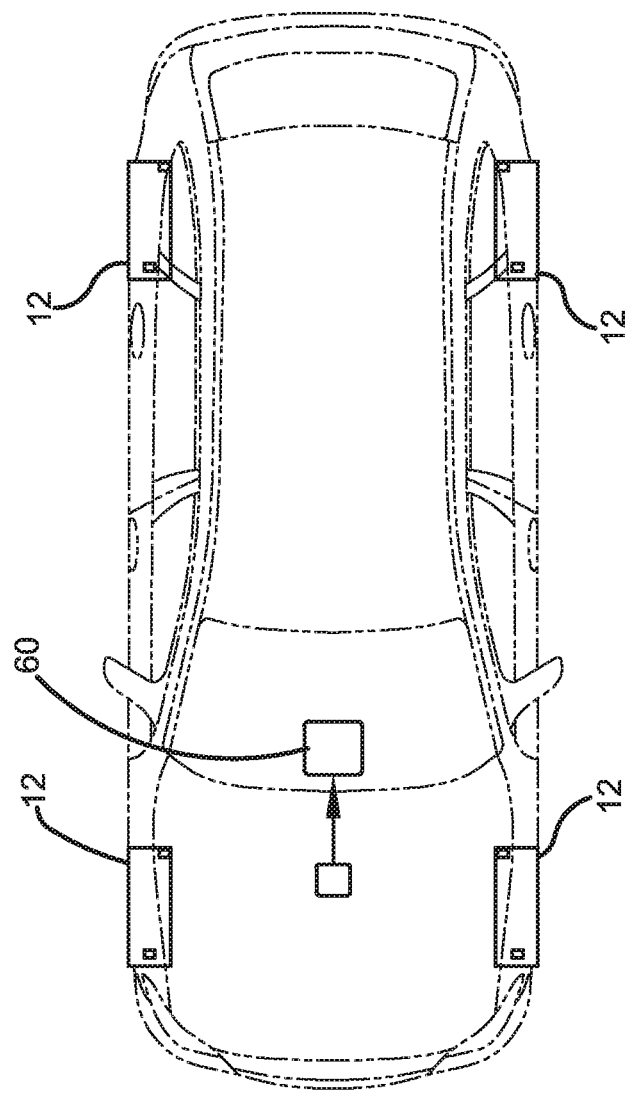
FIG. 7 is a schematic diagram of a vehicle having a tire and tread wear assembly mounted on each axle, and a single vehicle mounted RFID reader with power source from the vehicle.

An alternative embodiment is shown in FIG. 6 wherein there is a single RFID reader 60 that is mounted in the vehicle and is powerful enough to read the signals from the sensors. The reader 60 receives power from the vehicle battery.

In an alternate embodiment, the reader is at a remote location such as a drive over reader device. Alternatively, the reader may be powered by a small battery or energy harvestor embedded in the patch, or be hardwired to the vehicle battery as shown in FIG. 6.

When a measurement of tread wear is needed, the reader 40 provides wireless power to the RFID tag 400 and receives the electrical signal data from it. The tread depth measurement would only need to be taken and transmitted infrequently e.g., once a month due to the slow wear rate of tires, so power requirements would be low. The tread depth readings could be stored on a server for commercial tire management & data analysis. For consumer tires, the server could send emails to consumer warning of need to replace a worn-out tire. In addition, the non-skid of all four tires on a passenger car could be monitored as well as say both shoulders of each to give info on alignment maintenance. This convenience would be even more valuable on commercial fleet vehicles where the non-skid of all 18 wheels could be monitored automatically.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A vehicle tire and tread wear sensor comprising:
   a tire having a tread;
   a tread wear sensor mounted in the tread, said tread wear sensor comprising an insert having a plurality of electrical elements mounted thereon, wherein the plurality of electrical elements are made of an electroactive polymer and are located at different tread depths, wherein the plurality of electrical elements are in electrical communication with an RFID tag, wherein the electrical elements emit a voltage in response to deformation of the tread.

2. The vehicle tire and tread wear sensor of claim 1 wherein the RFID tag is mounted on the insert.

3. The vehicle tire and tread wear sensor of claim 1 wherein the RFID tag is mounted on the tread in a groove.

4. The vehicle tire and tread wear sensor of claim 1 wherein the RFID tag is mounted on the tread in a pocket of a groove.

5. The vehicle tire and tread wear sensor of claim 1 wherein the tread wear sensor is mounted in the tread in a sipe post cure of the tire.

6. The vehicle tire and tread wear sensor of claim 1 wherein the tread wear sensor is mounted to the side of a tread element.

7. The vehicle tire and tread wear sensor of claim 1 further comprising a reader.

8. The vehicle tire and tread wear sensor of claim 1 further comprising a data processor for determining a tread wear status of the tread based on the absence of an electrical signal from the electrical element.

9. The vehicle tire and tread wear sensor of claim 1 wherein the insert has a printed circuit made of conductive ink for electrical communications with the RFID tag and the electrical elements.

* * * * *